United States Patent
Monma et al.

(10) Patent No.: US 7,477,813 B2
(45) Date of Patent: Jan. 13, 2009

(54) MULTI-BEAM LIGHT SOURCE, METHOD FOR MANUFACTURING THE SAME, LIGHT SCANNING UNIT USING THE SAME, AND IMAGE FORMING APPARATUS USING THE SAME

(75) Inventors: Susumu Monma, Hitachinaka (JP); Takeshi Mochizuki, Hitachinaka (JP); Keiji Kataoka, Hitachinaka (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 0 days.

(21) Appl. No.: 11/653,225

(22) Filed: Jan. 16, 2007

(65) Prior Publication Data

US 2007/0165987 A1   Jul. 19, 2007

(30) Foreign Application Priority Data

Jan. 17, 2006   (JP) .............................. 2006-008750

(51) Int. Cl.
*G02B 6/26* (2006.01)
*G02B 6/42* (2006.01)

(52) U.S. Cl. ............................ 385/16; 385/15; 385/49; 385/17; 385/19; 385/20; 385/21; 385/22; 385/23; 385/25; 385/88; 385/129

(58) Field of Classification Search ........................ None
See application file for complete search history.

(56) References Cited

U.S. PATENT DOCUMENTS 5,612,815 A * 3/1997 Labeye et al. ................ 359/320
6,169,826 B1 * 1/2001 Nishiyama et al. ............ 385/22

FOREIGN PATENT DOCUMENTS

| JP | 9-146023 A | 6/1997 |
|---|---|---|
| JP | A-2001-033651 | 2/2001 |
| JP | A-2001-337284 | 12/2001 |
| JP | A-2003-114397 | 4/2003 |
| JP | A-2004-020794 | 1/2004 |
| JP | A-2005-352261 | 12/2005 |
| JP | A-2006-189705 | 7/2006 |
| JP | A-2007-017775 | 1/2007 |

* cited by examiner

*Primary Examiner*—Sung H Pak
*Assistant Examiner*—Chad H Smith
(74) *Attorney, Agent, or Firm*—Crowell & Moring LLP (57) ABSTRACT

The invention provides a multi-beam light source including a light guide array by which the yield can be improved. An array pitch P2 of entrance surfaces of light guide pattern is 1/N as wide as an array pitch P1 of exit surfaces of optical fiber arrays. The number of the light guide patterns is N or more times as large as the number of optical fibers. The exit surfaces of a plurality of the optical fibers are coupled with the entrance surfaces of a plurality of the light guide patterns opposed thereto.

8 Claims, 7 Drawing Sheets

MULTI-BEAM LIGHT SOURCE, METHOD FOR MANUFACTURING THE SAME, LIGHT SCANNING UNIT USING THE SAME, AND IMAGE FORMING APPARATUS USING THE SAME

FIELD OF THE INVENTION

The present invention relates to a multi-beam light source, a method for manufacturing the same, a light scanning unit using the same and an image forming apparatus using the same. Particularly, it relates to a technique for emitting a plurality of laser beams using a light guide array.

DESCRIPTION OF THE BACKGROUND ART

When optical recording is performed on a photoconductor scanned with a plurality of laser beams simultaneously by a rotary polygon mirror in a laser printer used as a typical image forming apparatus, the recording can be speeded up correspondingly to the number of beams even if the rotation velocity of the rotary polygon mirror cannot be increased. As a method for generating a plurality of laser beams, there is a method using an optical fiber array. There has been known an image forming apparatus for performing optical recording on a photoconductor scanned with a plurality of laser beams using such an optical fiber array (for example, see JP-A-9-146023).

In a background-art optical fiber array, optical fibers themselves have manufacturing errors. When a plurality of optical fibers are arranged into an array, core portions of the optical fibers are not aligned vertically so as to be not arranged on a straight line, or the core portions are arranged at uneven intervals. It is therefore difficult to arrange the optical fiber array precisely.

When the number of beams is further increased without changing the pitch of the beams, multiple beams pass through places far from the center of a lens. Thus, aberration increases. Therefore, in order to further increase the number of beams, it is necessary to arrange the beams at a narrower pitch. In the optical fiber array, it is however difficult to make the pitch not wider than the optical fiber diameter.

Further, when a semiconductor laser array is used in place of the optical fiber array, there is a problem of thermal crosstalk. It is therefore difficult to make the pitch narrower, and it is difficult to further increase the number of beams.

However, when a plurality of laser beams emitted from the optical fiber array or the semiconductor laser array are guided into a light guide array, it is possible to obtain multiple beams arrayed at a narrower pitch and with a higher accuracy. Thus, the number of beams from the multi-beam light source can be further increased, and the beams can be arrayed precisely. It is therefore possible to perform optical recording at a high speed and with a high accuracy.

The light guide array is manufactured as follows. That is, a guide layer is formed on a substrate. Guide patterns are formed by a lithographic process, a dry etching process, or the like. After that, an over-clad layer is formed. However, when a defect appears in a part of a light guide in the light guide array, the light guide array becomes defective. Thus, the light guide array cannot be used. Further, due to a change in process conditions, it is also likely that a light guide array having an intended line width cannot be manufactured.

SUMMARY OF THE INVENTION

An object of the present invention is to provide a multi-beam light source with improved yield, a light scanning unit using the same, and an image forming apparatus using the same.

In order to attain the foregoing object, according to a first configuration of the present invention, there is provided a multi-beam light source including:

an optical fiber array in which a plurality of optical fibers are arrayed or a semiconductor laser array in which a plurality of semiconductor lasers are arrayed; and a light guide array having a plurality of light guide patterns which are to be connected with exit surfaces of the optical fiber array or the semiconductor laser array so that a plurality of beams emitted from the optical fiber array or the semiconductor laser array are guided by the light guide patterns; wherein:

an array pitch P2 of entrance surfaces of the light guide patterns is 1/N time as small as an array pitch P1 of exit surfaces of the optical fiber array or the semiconductor laser array;

the number of the light guide patterns is N or more times as large as the number of the optical fibers or the semiconductor lasers (providing N is an integer not smaller than 2); and exit surfaces of the plurality of optical fibers or the plurality of semiconductor lasers are connected with entrance surfaces of a plurality of the light guide patterns opposed thereto.

According to a second configuration of the present invention, there is provided the multi-beam light source defined in the first configuration, wherein an array pitch P3 of exit surfaces of the light guide patterns is narrower than the array pitch P2.

According to a third configuration of the present invention, there is provided the multi-beam light source defined in the first configuration, wherein:

a plurality of groups of the light guide patterns are formed so that every N-th light guide pattern in the light guide array has an equal line width in each group but the line width is different from that in any other group (providing N is an integer not smaller than 2); and the exit surfaces of the plurality of optical fibers or the plurality of semiconductor lasers are connected with entrance surfaces of light guide patterns in one of the plurality of groups.

According to a fourth configuration of the present invention, there is provided a method for manufacturing a multi-beam light source including:

an optical fiber array in which a plurality of optical fibers are arrayed or a semiconductor laser array in which a plurality of semiconductor lasers are arrayed; and a light guide array having a plurality of light guide patterns which are to be connected with exit surfaces of the optical fiber array or the semiconductor laser array so that a plurality of beams emitted from the optical fiber array or the semiconductor laser array are guided by the light guide patterns; wherein:

an array pitch P2 of entrance surfaces of the light guide patterns is 1/N time as small as an array pitch P1 of exit surfaces of the optical fiber array or the semiconductor laser array;

the number of the light guide patterns is N or more times as large as the number of the optical fibers or the semiconductor lasers (providing N is an integer not smaller than 2); and the method includes the steps of:

temporarily connecting exit surfaces of the plurality of optical fibers or the plurality of semiconductor lasers with entrance surfaces of a plurality of the light guide patterns opposed thereto;

transmitting light from the plurality of optical fibers or the plurality of semiconductor lasers to the light guide patterns connected therewith in the state where the optical fibers or the semiconductor lasers have been temporarily connected, so as to examine existence of defects in the light guide patterns; and removing the exit surfaces of the optical fibers or the semiconductor lasers from light guide patterns having defects proved by the examination step, and permanently connecting the exit surfaces of the optical fibers or the semiconductor lasers to the other light guide patterns.

According to a fifth configuration of the present invention, there is provided a method for manufacturing a multi-beam light source including:

an optical fiber array in which a plurality of optical fibers are arrayed or a semiconductor laser array in which a plurality of semiconductor lasers are arrayed; and a light guide array having a plurality of light guide patterns which are to be connected with exit surfaces of the optical fiber array or the semiconductor laser array so that a plurality of beams emitted from the optical fiber array or the semiconductor laser array are guided by the light guide patterns; wherein:

an array pitch P2 of entrance surfaces of the light guide patterns is 1/N time as small as an array pitch P1 of exit surfaces of the optical fiber array or the semiconductor laser array;

the number of the light guide patterns is N or more times as large as the number of the optical fibers or the semiconductor lasers (providing N is an integer not smaller than 2); and the method includes:

a first temporary connection step of temporarily connecting exit surfaces of the plurality of optical fibers or the plurality of semiconductor lasers with entrance surfaces of a plurality of the light guide patterns opposed thereto;

a first examination step of transmitting light from the plurality of optical fibers or the plurality of semiconductor lasers to the light guide patterns connected therewith in the state where the optical fibers or the semiconductor lasers have been temporarily connected in the first temporary connection step, so as to examine light transmission rates of the light guide patterns;

a second temporary connection step of removing the exit surfaces of the plurality of optical fibers or the plurality of semiconductor lasers from the light guide patterns connected in the first temporary connection step, and temporarily connecting the exit surfaces of the plurality of optical fibers or the plurality of semiconductor lasers to entrance surfaces of the other light guide patterns which have not been examined;

a second examination step of transmitting light from the plurality of optical fibers or the plurality of semiconductor lasers to the light guide patterns connected therewith in the state where the optical fibers or the semiconductor lasers have been temporarily connected in the second temporary connection step, so as to examine light transmission rates of the light guide patterns; and a permanent connection step of permanently connecting the optical fibers or the semiconductor lasers to the light guide patterns by a combination of the optical fibers or the semiconductor lasers and the light guide patterns proved to obtain higher light transmission rates in the first examination step and the second examination step.

According to a sixth configuration of the present invention, there is provided a light scanning unit including a multi-beam light source, and a rotary polyhedron for deflecting beams from the multi-beam light source simultaneously by one and the same reflective surface so as to scan with the deflected beams;

wherein the multi-beam light source is a multi-beam light source according to any one of the first to third configurations.

According to a seventh configuration of the present invention, there is provided an image forming apparatus including a photoconductor, a charging unit for charging the photoconductor, a light scanning unit for optically scanning the photoconductor so as to form an electrostatic latent image on the photoconductor in accordance with image information to be recorded, a developing unit for attaching toner to the electrostatic latent image so as to form a toner image, a transfer unit for transferring the toner image onto a recording piece, and a fixation unit for fixing the transferred toner image onto the recording piece;

wherein the light scanning unit is a light scanning unit according to the sixth configuration.

Due to the aforementioned configurations of the present invention, it is possible to provide a multi-beam light source including a light guide array having a structure by which the yield can be improved, a light scanning unit using the multi-beam light source, and an image forming apparatus using the same.

DETAILED DESCRIPTION OF THE INVENTION

Figure 3:
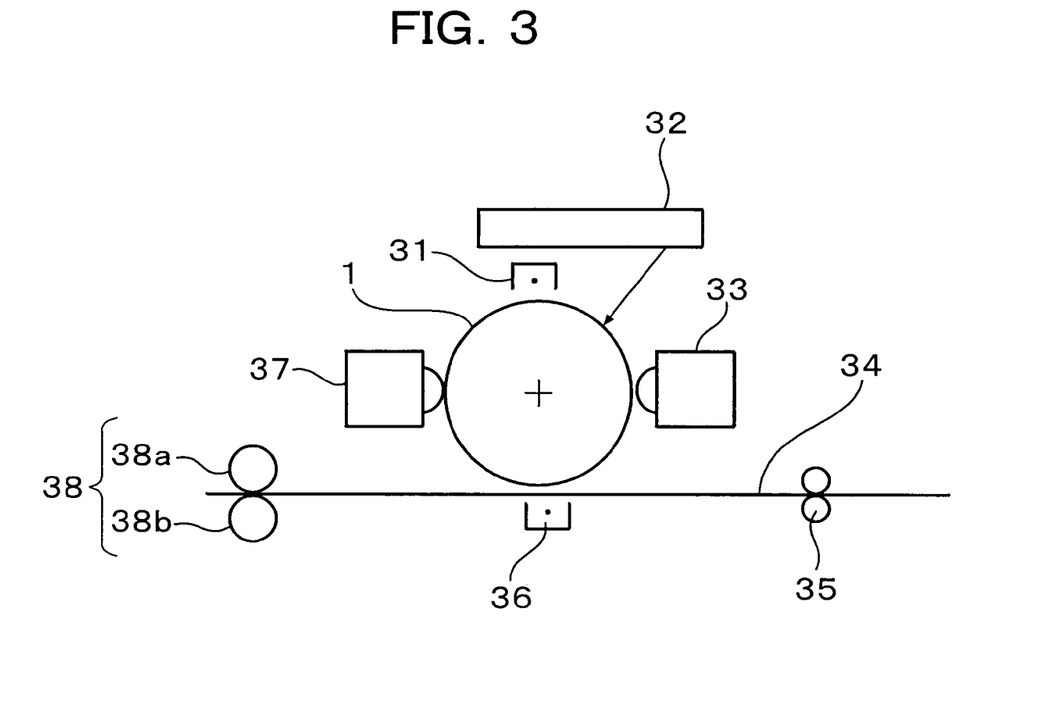
FIG. 3 is a schematic configuration view of an image forming apparatus according to an embodiment of the present invention.

First, a schematic configuration of an image forming apparatus according to an embodiment of the present invention will be described with reference to FIG. 3.

A photoconductor drum 1 for forming a toner image is driven to rotate at a constant peripheral velocity by a not-shown motor. The photoconductor drum 1 is charged uniformly to have a specific polarity by a charging unit 31, and exposed to light from a light scanning unit 32 which will be described later. Thus, an electrostatic latent image corresponding to image information to be recorded is formed in the photoconductor drum 1. A developing unit 33 is disposed on the rotation-direction downstream side of the exposure position. A toner image is formed on the photoconductor drum 1 by the developing unit 33.

Printing paper 34 serving as a printing medium is conveyed by a conveyance unit 35 such as a conveyance roller pair. The back surface of the printing paper 34 is charged with a polarity reverse to that of the toner by a transfer unit 36. Thus, the toner image on the photoconductor drum 1 is transferred onto the printing paper 34. The printing paper 34 is conveyed to a fixation unit 38. Toner staying on the photoconductor drum 1 without being transferred is removed by a cleaning unit 37.

The fixation unit 38 is constituted by a heating roller 38a controlled to be heated to a fixed temperature, and a pressure roller 38b brought into pressure contact with the heating roller 38a. When the printing paper 34 passes through the fixation unit 38, the toner on the printing paper 34 is heated and melted to be fixed thereon. The printing paper 34 is then discharged to the outside of the apparatus.

Next, a schematic configuration of a light scanning unit using a multi-beam light source will be described with reference to FIGS. 1 and 2.

Figure 1:
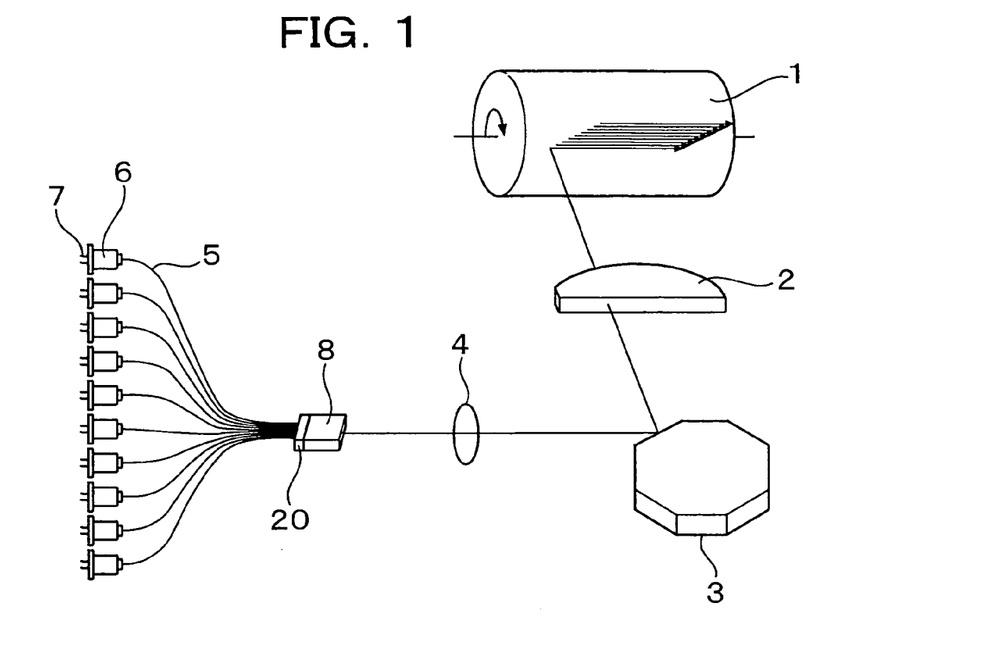
FIG. 1 is a schematic configuration view of a light scanning unit according to an embodiment of the present invention.

FIG. 1 shows an example where a light guide array is connected to an optical fiber array as a multi-beam light source. A laser beam emitted from a semiconductor laser 7 is guided to a semiconductor laser module 6. A plurality of such semiconductor laser modules 6 are prepared. Exit surface sides of single-mode optical fibers 5 of the semiconductor laser modules 6 are arranged like an array by an optical fiber array 20.

The exit end surface of the optical fiber array 20 is connected to the entrance end surface of the light guide array 8. The pitch of the plurality of laser beams guided to the light guide array 8 is narrowed, and the laser beams are emitted from the exit end surface of the light guide array 8. The multiple beams emitted from the light guide array 8 are guided onto a polygon mirror 3 by a lens 4. The beams reflected on the polygon mirror 3 pass through an Fθ lens 2, and then form an image on a photoconductor drum 1. Thus, the photoconductor drum 1 is optically scanned with the beams.

Figure 2:
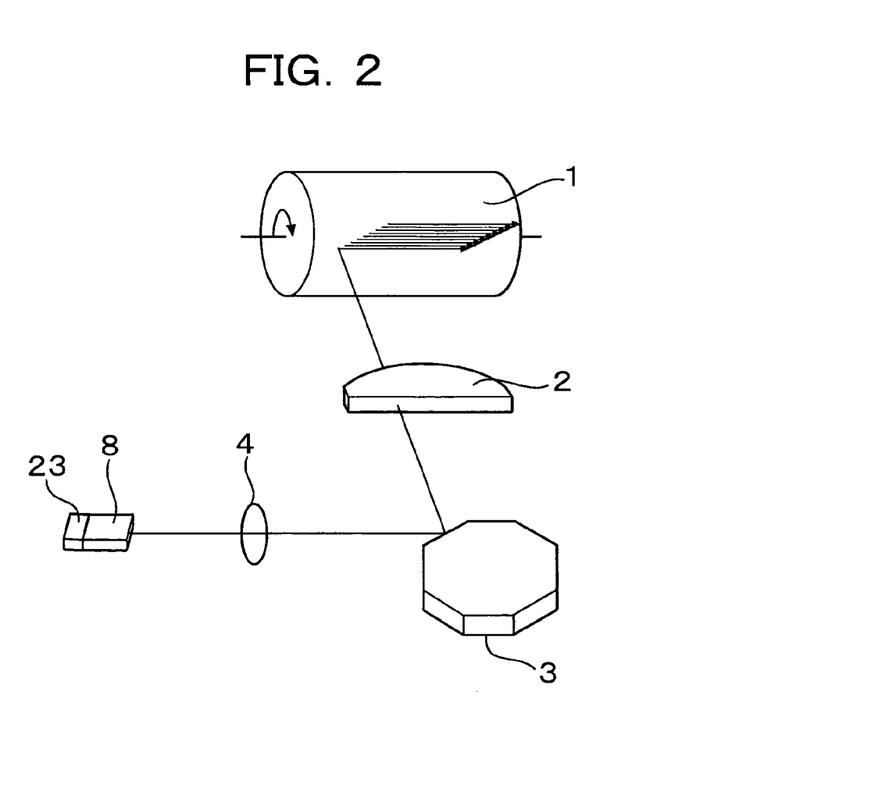
FIG. 2 is a schematic configuration view of a light scanning unit according to an embodiment of the present invention.

FIG. 2 shows an example where a light guide array 8 is connected to a semiconductor laser array 23 as a multi-beam light source. The semiconductor laser array 23 is constituted by an array of a plurality of semiconductor lasers (not shown). Laser beams emitted from the semiconductor laser array 23 are guided to the light guide array 8. The multiple beams emitted from the light guide array 8 are guided onto a polygon mirror 3 by a lens 4. The beams reflected on the polygon mirror 3 pass through an Fθ lens 2, and then form an image on a photoconductor drum 1. Thus, the photoconductor drum 1 is optically scanned with the beams.

Figure 4:
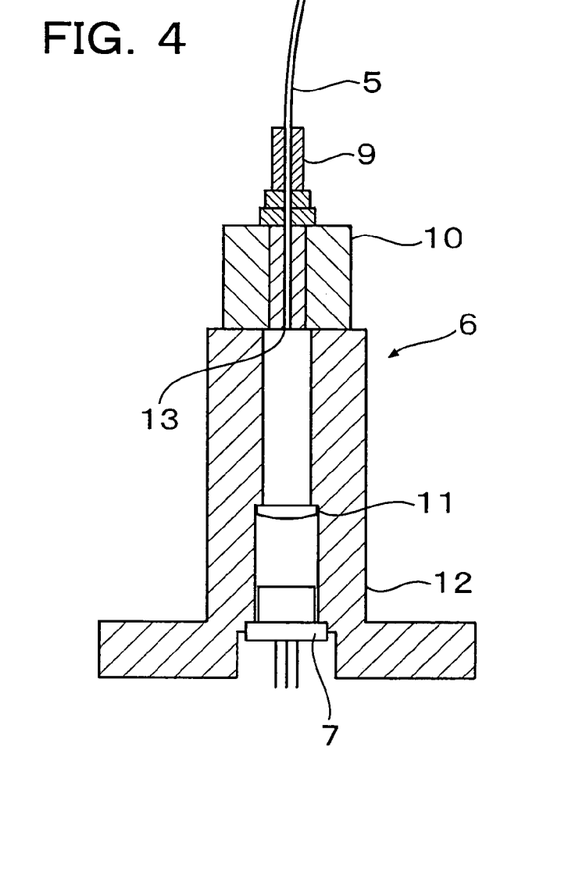
FIG. 4 is a sectional view of a semiconductor laser module according to an embodiment of the present invention.

FIG. 4 is a sectional view of the semiconductor laser module 6. The semiconductor laser 7 is fixedly welded with an LD holder 12 to which a lens 11 is fixedly bonded. A ferrule 9 is fixedly bonded to an entrance end portion of an optical fiber 5, and the end surface thereof is polished. After that, the ferrule 9 is fixedly welded with a ferrule holder 10. The ferrule holder 10 and the LD holder 12 are aligned to maximize their coupling efficiency. After that, the ferrule holder 10 and the LD holder 12 are fixedly welded. A laser beam emitted from the semiconductor laser 7 is incident on an entrance end surface 13 of the optical fiber 5, and guided to the light guide array 8 through the optical fiber 5.

Figure 5:
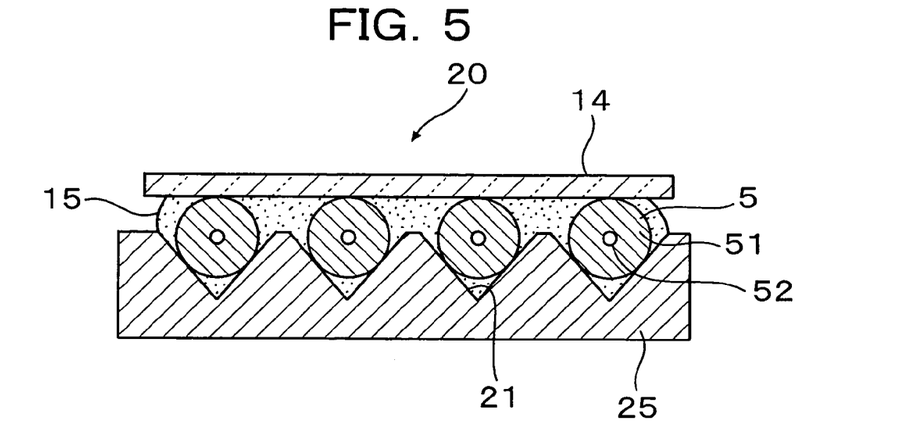
FIG. 5 is a sectional view of an optical fiber array according to an embodiment of the present invention.

FIG. 5 is a sectional view of the optical fiber array 20. A plurality of V-shaped grooves 21 are formed at a predetermined pitch on a substrate 25 made of a silicon wafer or the like. The exit end portions of the optical fibers 5 are inserted into the V-shaped grooves 21 respectively. The optical fibers 5 are pressed by a glass plate 14 through a thermosetting adhesive 15, and fixedly bonded. After that, the end surfaces of the optical fibers 5 are polished. The reference numeral 52 in FIG. 5 represents a core portion of each optical fiber 5; and 51, a clad portion surrounding the outer circumference of the core portion 52.

Figure 6A:
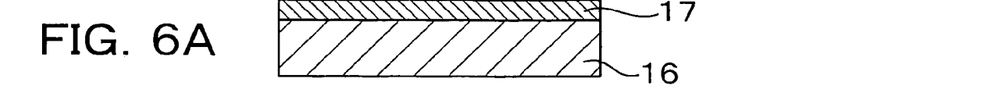
FIGS. 6A-6E are process views for explaining a manufacturing process of a light guide array according to an embodiment of the present invention.

FIGS. 6A to 6E are process views for explaining a manufacturing process of the light guide array 8. First, as shown in FIG. 6A, a light guide layer 17 is formed on a substrate 16 made of a silicon wafer with a thermally oxidized film. The silicon wafer is composed of quartz glass, $SiO_2$ or the like.

$SiO_2$ doped with a material such as $GeO_2$ or $TiO_2$ is used as the light guide layer 17. A thin film forming technique such as a chemical vapor deposition (such as thermal CVD or plasma CVD) method, an electron beam deposition method, a sputtering method, or the like is generally used as the method for forming the light guide layer 17. After that, the substrate 16 is thermally treated at a high temperature (about 800° C. to 1,300° C.). Due to this thermal treatment, the light guide layer 17 can be formed into a dense and transparent glass film.

Figure 6B:
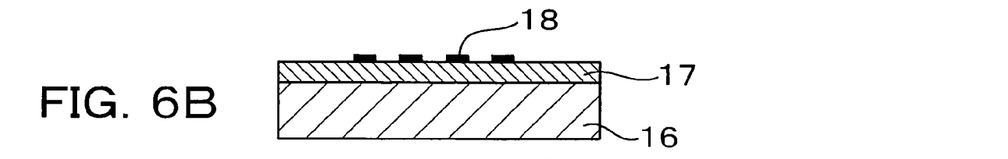

Next, as shown in FIG. 6B, a metal film as a metal mask, for example, a mask made of Cr is deposited on the surface of the light guide layer 17 made of the glass film, by use of an electron beam deposition method, a sputtering method, or the like. Photolithography for forming photo-resist patterns is performed, and wet etching is then performed. Thus, metal film patterns 18 are formed on the light guide layer 17.

Figure 6C:
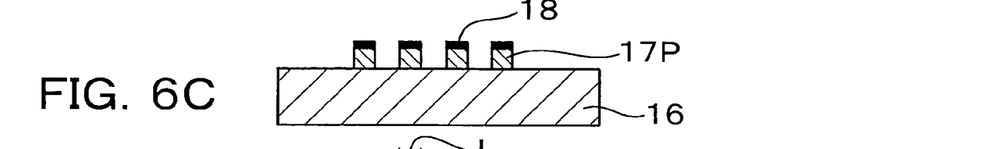
Figure 6D:
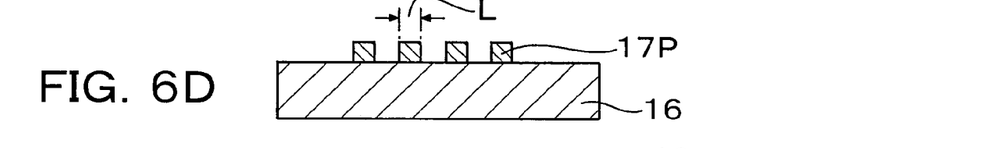
Figure 6E:
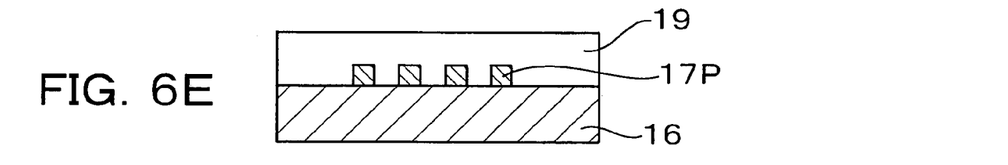

After that, dry etching is performed to form light guide patterns 17P as shown in FIG. 6C, and the metal film patterns 18 are removed as shown in FIG. 6D. Finally, as shown in FIG. 6E, an over-clad layer 19 made of $SiO_2$ or the like is formed on the light guide patterns 17P by a chemical vapor deposition (such as thermal CVD or plasma CVD) method, a sputtering method, a fire deposition method, or the like. Thus, the light guide array 8 is obtained.

Figure 7:
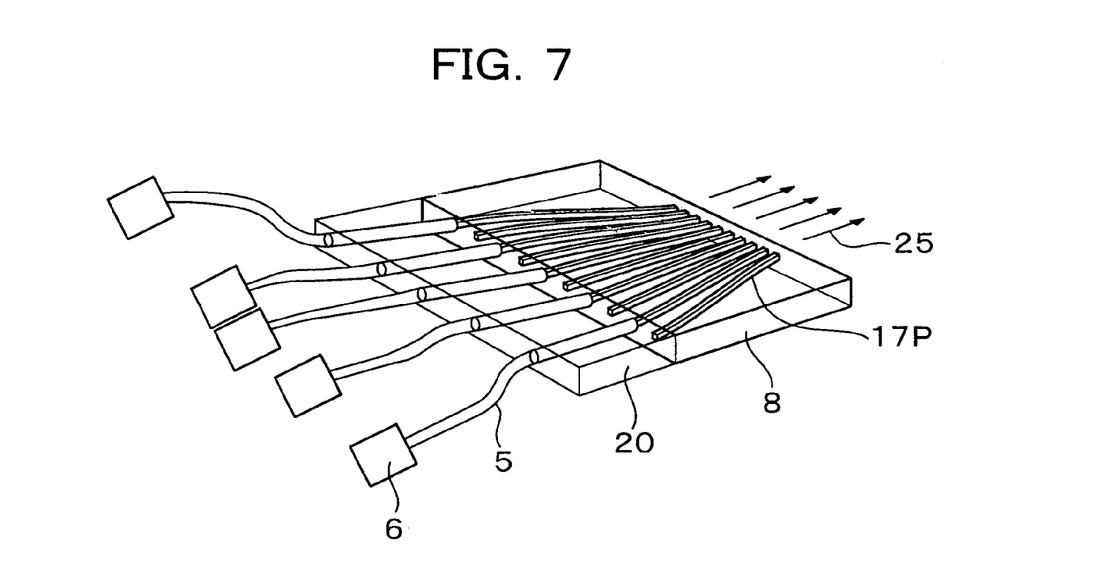
FIG. 7 is a schematic view of a multi-beam light source according to an embodiment of the present invention.

An end surface of the light guide array 8 manufactured thus is polished, and then coupled with the exit end surface of the optical fiber array 20 as shown in FIG. 7. The light guide array 8 and the optical fiber array 20 are aligned to maximize the coupling efficiency, and then fixedly bonded by use of an adhesive such as UV resin.

Figure 8:
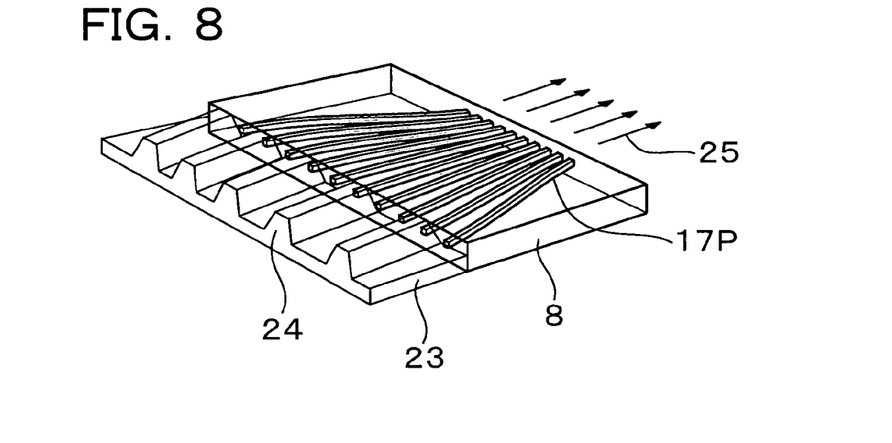
FIG. 8 is a schematic view of a multi-beam light source according to an embodiment of the present invention.

Alternatively, as shown in FIG. 8, the light guide array 8 whose end surface has been polished is coupled with the semiconductor laser array 23, aligned to maximize the coupling efficiency, and then fixed by bonding, soldering or the like.

Figure 9:
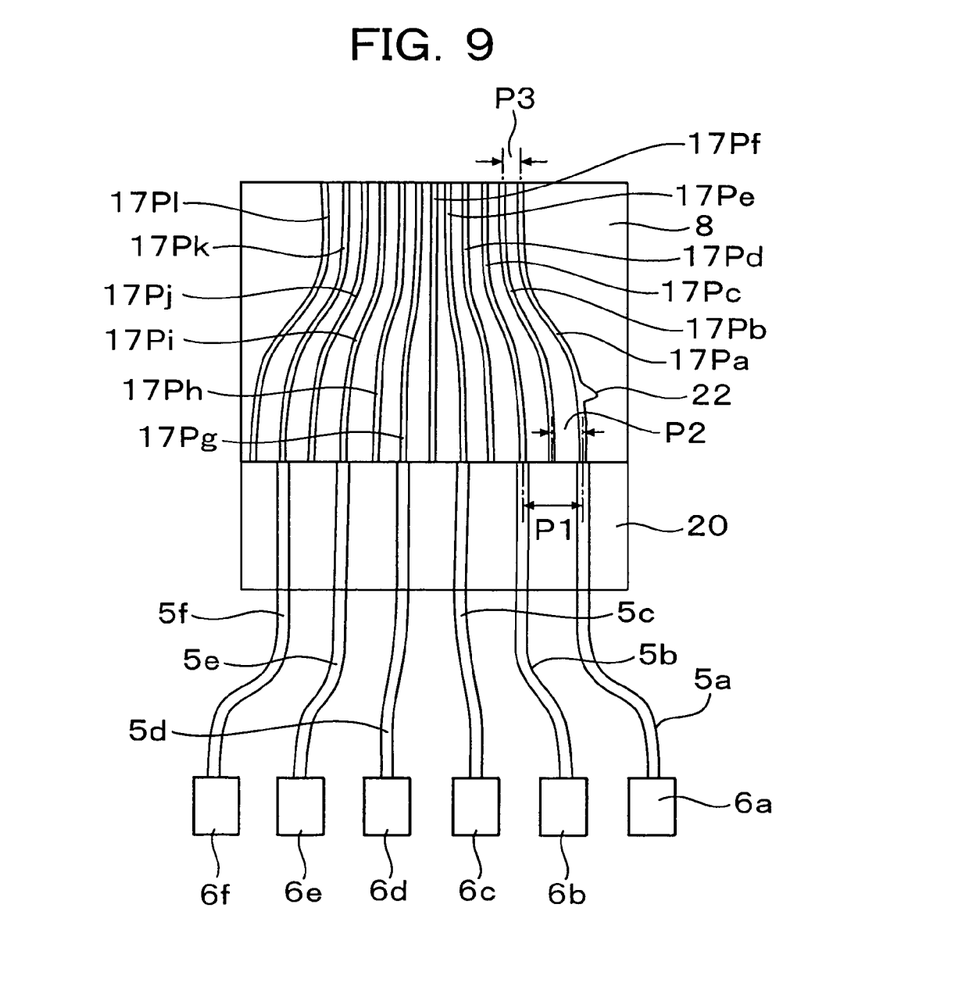
FIG. 9 is a view for explaining a multi-beam light source according to a first embodiment of the present invention.
Figure 10:
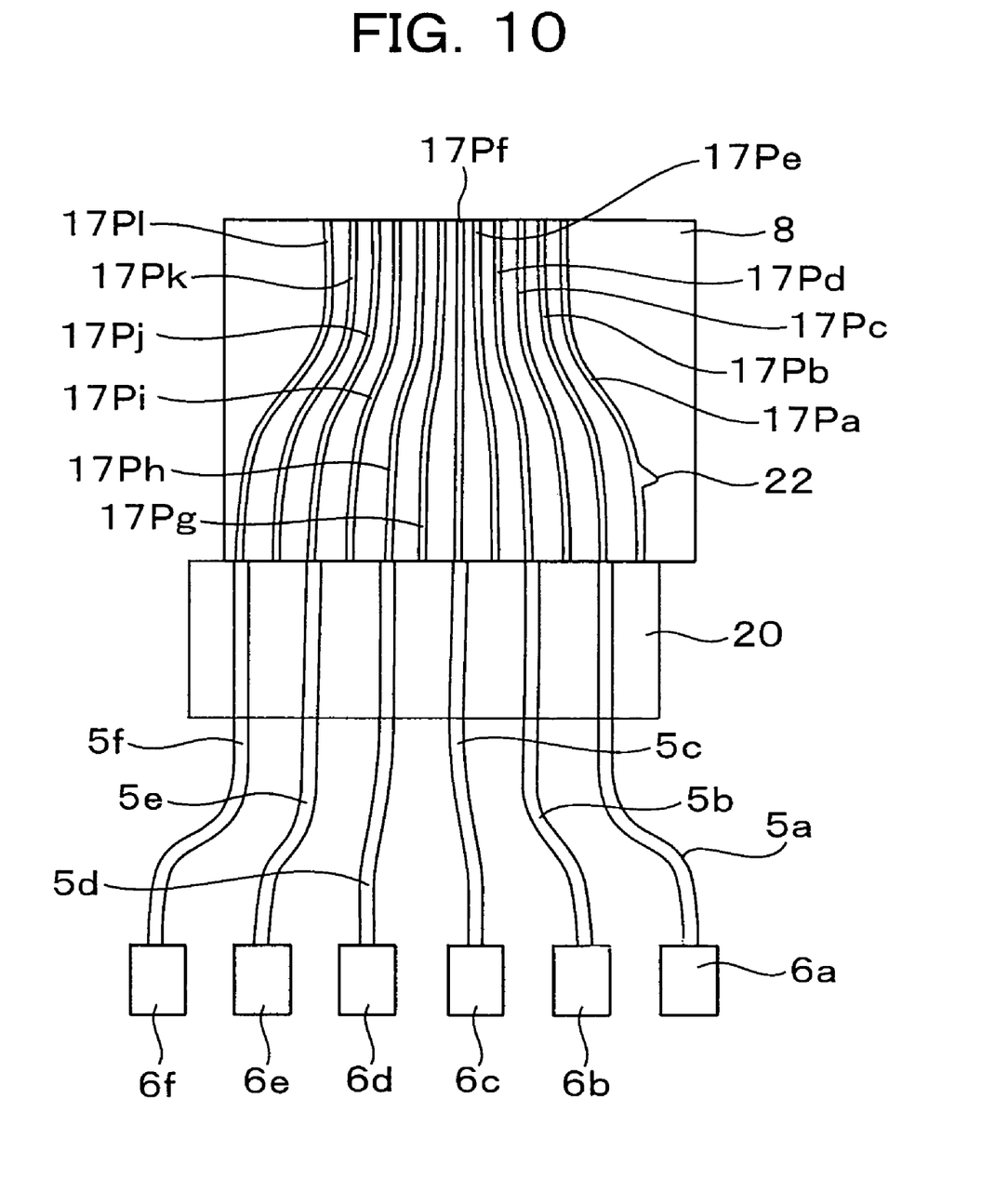
FIG. 10 is a view for explaining the multi-beam light source according to the first embodiment of the present invention.
Figure 11:
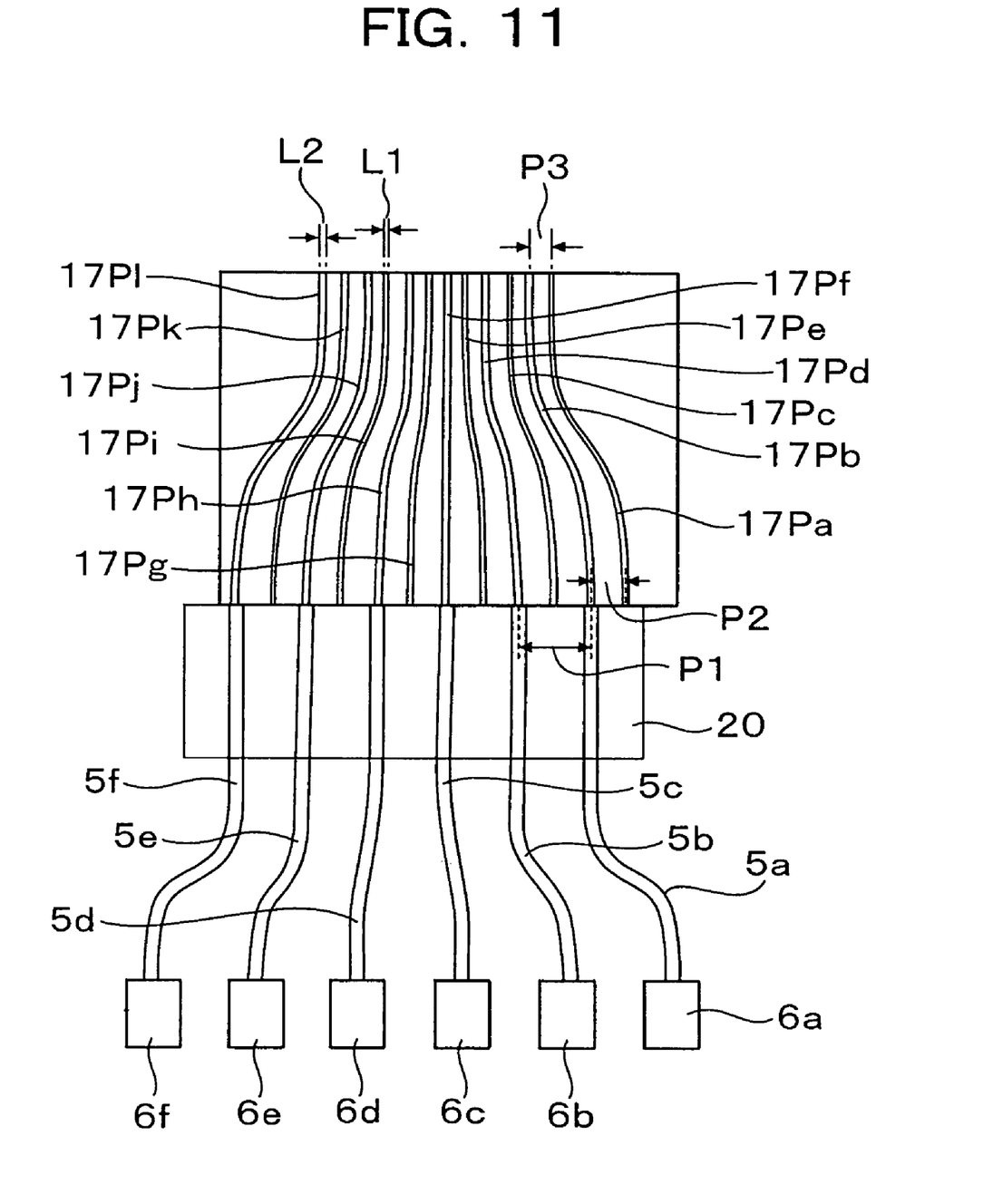
FIG. 11 is a view for explaining a multi-beam light source according to a second embodiment of the present invention.

Multi-beam light sources according to embodiments of the present invention will be described with reference to FIGS. 9 to 11. FIGS. 9 to 11 show multi-beam light sources where the optical fiber array 20 has been connected to the light guide array 8. However, the optical fiber array 20 may be replaced by the semiconductor laser array 23.

FIGS. 9 and 10 are views for explaining the first embodiment. In this embodiment, the optical fiber array 20 is arranged as shown in FIG. 9. That is, six optical fibers 5a to 5f are connected to six semiconductor laser modules 6a to 6f respectively. Exit ends of the six optical fibers 5a to 5f are fixedly arrayed on a substrate as shown in FIG. 5. The array pitch of the optical fibers 5a to 5f in the optical fiber array 20 is set as P1 as shown in FIG. 9.

On the other hand, the light guide array 8 is arranged as follows. That is, light guide patterns 17Pa to 17Pl are formed by a process as shown in FIGS. 6A to 6E. The number of the light guide patterns 17Pa to 17Pl are N times as large as the number of the optical fibers 5a to 5f (providing N is an integer not smaller than 2 such as 2, 3 or 4, N is 2 in this embodiment, and the total number of the light guide patterns is 12).

The array pitch of the entrance end surfaces of the light guide patterns 17Pa to 17Pl to be connected to the optical fiber array 20 is set as P2 as shown in FIG. 9. This array pitch P2 is set to be 1/N (1/2 in this embodiment) as large as the aforementioned array pitch P1. On the other hand, the exit end surfaces of the light guide patterns 17Pa to 17Pl are set to approach the center as illustrated in FIG. 9, so that the array pitch P3 of the exit end surfaces is narrower than the array pitch P2 of the entrance end surfaces. Thus, the array pitches P have a relation of P1>P2(=P1·1/N)>P3.

Each array pitch P2, P3 is, for example, preferably set to be about 5 μm to 40 μm. If the array pitch is not wider than 4 μm, there will arise a problem of crosstalk among the light guide patterns.

In this embodiment, the line width L (see FIG. 6D) of each light guide pattern 17Pa-17Pl is set to maximize the light utilization efficiency when the light guide pattern is coupled with the optical fiber 5. The light guide patterns 17 can be manufactured microscopically and precisely by the process as shown in FIGS. 6A to 6E.

In the background art, an optical fiber array and a light guide array are coupled with each other, and a light circuit test is performed. When a defect is found in the light guide array in the test, the light guide array is regarded as defective. Thus, the yield is low.

In this embodiment, therefore, as shown in FIG. 9, the optical fibers 5a to 5f of the optical fiber array 20 are temporarily coupled with alternate light guide patterns 17Pa to 17Pl, for example, by use of a jig. Laser beams are emitted from the semiconductor laser modules 6a to 6f. Thus, the circuit state of laser beams 25 (see FIG. 7) through the light guide patterns 17Pa to 17Pl are optically inspected (specifically luminous energy of each laser beam 25 passing through each light guide pattern is inspected).

For example, now assume that it is found that there is a defect 22 in the end-side light guide pattern 17Pa temporarily coupled with the optical fiber 5a. In this case, the temporary coupling between the optical fiber array 20 and the light guide array 8 is released. Then, as shown in FIG. 10, each optical fiber 5a-5f is moved to the next one of the light guide patterns 17Pa-17Pl. That is, the optical fibers 5a to 5f are permanently coupled to other light guide patterns than the light guide pattern 17Pa, for example, by bonding or soldering. Thus, the light guide array 8 can be used as non-defective. It is therefore possible to improve the yield.

In this first embodiment, 12 light guide patterns 17P twice as many as 6 optical fibers 5 are provided. However, for example, 15 light guide patterns 17P (N or more times as many as the number of the optical fibers 5) may be provided for the 6 optical fibers 5. That is, for example, 3 light guide patterns may be added to the first embodiment. In this case, it is possible to deal with a defect 22 in any light guide pattern 17P of three in either side (six in total) of the 15 light guide patterns 17P.

In addition to the problem of the defect, variations in manufacturing process conditions or the like lead to a problem in matching between the optical fiber array and the light guide array. Due to poor matching, there is a fear that the specification of luminous energy emitted from the light guide array may be not satisfied.

The second embodiment shown in FIG. 11 is intended to solve such a problem. Six optical fibers 5a to 5f are connected to six semiconductor laser modules 6a to 6f respectively. Six exit end surfaces of the six optical fibers 5a to 5f are fixedly arrayed on a substrate as shown in FIG. 11. Thus, an optical fiber array 20 is arranged. The array pitch of the optical fibers 5a to 5f in the optical fiber array 20 is set as P1.

On the other hand, in a light guide array 8, light guide patterns 17Pa to 17Pl are formed. The number of the light guide patterns 17Pa to 17Pl are N times as large as the number of the optical fibers 5a to 5f (N is 2 in this embodiment, and the total number of the light guide patterns is 12).

The array pitch of the entrance end surfaces of the light guide patterns 17Pa to 17Pl to be connected to the optical fiber array 20 is set as P2. This array pitch P2 is set to be 1/N (1/2 in this embodiment) as large as the aforementioned array pitch P1. On the other hand, the exit end surfaces of the light guide patterns 17Pa to 17Pl are set to approach the center as illustrated in FIG. 11, so that the array pitch P3 of the exit end surfaces is narrower than the array pitch P2 of the entrance end surfaces. Thus, the array pitches P have a relation of P1>P2(=P1·1/N)>P3. Description up to now is the same as the first embodiment.

The second embodiment is the same as the first embodiment, except that a plurality of groups (two groups in this embodiment) are formed so that every N-th light guide pattern of the light guide patterns 17Pa to 17Pl (N=2 in this embodiment, that is, alternate light guide patterns) has an equal line width L in each group but the line width L is different from that in any other group.

Specifically, 12 guide patterns are formed into two groups each including 6 guide patterns as shown in FIG. 11. That is, alternate guide patterns 17Pa, 17Pc, 17Pe, 17Pg, 17Pi, 17Pk belong to a first group having a line width L1, while the other alternate light guide patterns 17Pb, 17Pd, 17Pf, 17Ph, 17Pj and 17Pl belong to a second group having a line width L2. The line width L1 is different from the line width L2 (the line widths have a relation of L1<L2 in this embodiment).

FIG. 11 shows a state where the second group is connected to the optical fibers 5a to 5f. In this state, optical circuit test is performed. Next, the first group is connected to the optical fibers 5a to 5f, and optical circuit test is performed. Based on the test results, a group good in matching with the optical fiber array 20 (optical fibers 5a to 5f) is selected and the optical fiber array 20 and the light guide array 8 are permanently coupled with each other.

When the optical fiber array 20 is manufactured, there may arise a problem in matching on the optical fiber array 20 because, for example, the core portions 52 of the optical fibers 5 are out of position so that the core portions 52 are not aligned.

Even in such a case, the number of the light guide patterns 17P is set to be N or more times as large as the number of the optical fibers 5, and the array pitch P2 of the entrance end surfaces of the light guide patterns 17P is set to be 1/N as wide as the array pitch P1 of the optical fibers 5. Matching test is performed between the optical fiber array 20 and the light guide array 8 in the same manner as described previously. Thus, a coupling position with best matching can be determined.

The aforementioned embodiments show examples where the number of light guide patterns on a light guide array is small enough to prevent the drawings from being complicated. In fact, however, a large number of light guide patterns, for example, about 20-30 light guide patterns are formed on a light guide array, and about 10 of the light guide patterns are connected to an optical fiber array or a semiconductor laser array.

According to the present invention, there appear light guide patterns which are not used as light sources. However, there is no fear that those unused light guide patterns have any adverse optical effect on the other light guide patterns in use.

What is claimed is:

1. A multi-beam light source comprising:
    an optical fiber array in which a plurality of optical fibers are arrayed or a semiconductor laser array in which a plurality of semiconductor lasers are arrayed; and
    a light guide array having a plurality of light guide patterns which are to be connected with exit surfaces of the optical fiber array or the semiconductor laser array so that a plurality of beams emitted from the optical fiber array or the semiconductor laser array are guided by the light guide patterns; wherein:
    an array pitch P2 of entrance surfaces of the light guide patterns is 1/N time as small as an array pitch P1 of exit surfaces of the optical fiber array or the semiconductor laser array;
    an array pitch P3 of exit surfaces of the light guide patterns is narrower than the array pitch P2;
    the number of the light guide patterns is N or more times as large as the number of the optical fibers or the semiconductor lasers (providing N is an integer not smaller than 2); and
    exit surfaces of the plurality of optical fibers or the plurality of semiconductor lasers are connected with entrance surfaces of a plurality of the light guide patterns opposed thereto.

2. A multi-beam light source according to claim 1, wherein:
    a plurality of groups of the light guide patterns are formed so that every N-th light guide pattern in the light guide array has an equal line width in each group but the line width is different from that in any other group (providing N is an integer not smaller than 2); and
    the exit surfaces of the plurality of optical fibers or the plurality of semiconductor lasers are connected with entrance surfaces of light guide patterns in one of the plurality of groups.

3. A method for manufacturing a multi-beam light source including:
    an optical fiber array in which a plurality of optical fibers are arrayed or a semiconductor laser array in which a plurality of semiconductor lasers are arrayed; and
    a light guide array having a plurality of light guide patterns which are to be connected with exit surfaces of the optical fiber array or the semiconductor laser array so that a plurality of beams emitted from the optical fiber array or the semiconductor laser array are guided by the light guide patterns; wherein:
    an array pitch P2 of entrance surfaces of the light guide patterns is 1/N time as small as an array pitch P1 of exit surfaces of the optical fiber array or the semiconductor laser array;
    the number of the light guide patterns is N or more times as large as the number of the optical fibers or the semiconductor lasers (providing N is an integer not smaller than 2); and
    the method comprises the steps of:
    temporarily connecting exit surfaces of the plurality of optical fibers or the plurality of semiconductor lasers with entrance surfaces of a plurality of the light guide patterns opposed thereto;
    transmitting light from the plurality of optical fibers or the plurality of semiconductor lasers to the light guide patterns connected therewith in the state where the optical fibers or the semiconductor lasers have been temporarily connected, so as to examine existence of defects in the light guide patterns; and
    removing the exit surfaces of the optical fibers or the semiconductor lasers from light guide patterns having defects proved by the examination step, and permanently connecting the exit surfaces of the optical fibers or the semiconductor lasers to the other light guide patterns.

4. A method for manufacturing a multi-beam light source including:
    an optical fiber array in which a plurality of optical fibers are arrayed or a semiconductor laser array in which a plurality of semiconductor lasers are arrayed; and
    a light guide array having a plurality of light guide patterns which are to be connected with exit surfaces of the optical fiber array or the semiconductor laser array so that a plurality of beams emitted from the optical fiber array or the semiconductor laser array are guided by the light guide patterns; wherein:
    an array pitch P2 of entrance surfaces of the light guide patterns is 1/N time as small as an array pitch P1 of exit surfaces of the optical fiber array or the semiconductor laser array;
    the number of the light guide patterns is N or more times as large as the number of the optical fibers or the semiconductor lasers (providing N is an integer not smaller than 2); and
    the method comprises:
    a first temporary connection step of temporarily connecting exit surfaces of the plurality of optical fibers or the plurality of semiconductor lasers with entrance surfaces of a plurality of the light guide patterns opposed thereto;
    a first examination step of transmitting light from the plurality of optical fibers or the plurality of semiconductor lasers to the light guide patterns connected therewith in the state where the optical fibers or the semiconductor lasers have been temporarily connected in the first temporary connection step, so as to examine light transmission rates of the light guide patterns;
    a second temporary connection step of removing the exit surfaces of the plurality of optical fibers or the plurality of semiconductor lasers from the light guide patterns connected in the first temporary connection step, and temporarily connecting the exit surfaces of the plurality of optical fibers or the plurality of semiconductor lasers to entrance surfaces of the other light guide patterns which have not been examined;
    a second examination step of transmitting light from the plurality of optical fibers or the plurality of semiconductor lasers to the light guide patterns connected therewith in the state where the optical fibers or the semiconductor lasers have been temporarily connected in the second temporary connection step, so as to examine light transmission rates of the light guide patterns; and
    a permanent connection step of permanently connecting the optical fibers or the semiconductor lasers to the light guide patterns by a combination of the optical fibers or the semiconductor lasers and the light guide patterns proved to obtain higher light transmission rates in the first examination step and the second examination step.

5. A light scanning unit comprising:
    a multi-beam light source; and
    a rotary polyhedron for deflecting beams from the multi-beam light source simultaneously by one and the same reflective surface so as to scan with the deflected beams;

wherein the multi-beam light source is a multi-beam light source according to claim 1.

6. An image forming apparatus comprising:

a photoconductor;

a charging unit for charging the photoconductor;

a light scanning unit for optically scanning the photoconductor so as to form an electrostatic latent image on the photoconductor in accordance with image information to be recorded;

a developing unit for attaching toner to the electrostatic latent image so as to form a toner image;

a transfer unit for transferring the toner image onto a recording piece; and a fixation unit for fixing the transferred toner image onto the recording piece;

wherein the light scanning unit is a light scanning unit according to claim 5.

7. A multi-beam light source according to claim 1, wherein the light guide array is a non-optical fiber array.

8. A multi-beam light source according to claim 7, wherein the light guide patterns are etched patterns formed on a silicon wafer substrate.

* * * * *